May 20, 1947.　　　J. B. COHEN ET AL　　　2,420,654
MICRO-AREA PRECISION LOCATOR
Filed Sept. 23, 1944　　　3 Sheets-Sheet 3
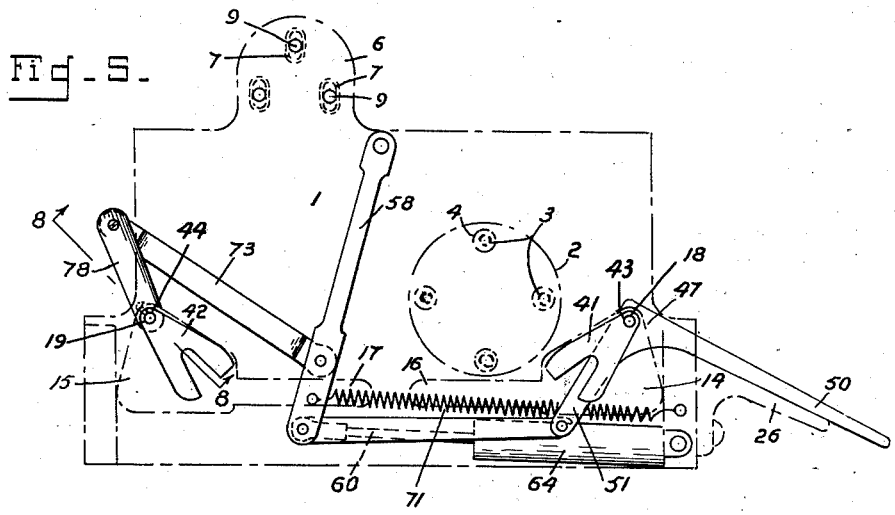
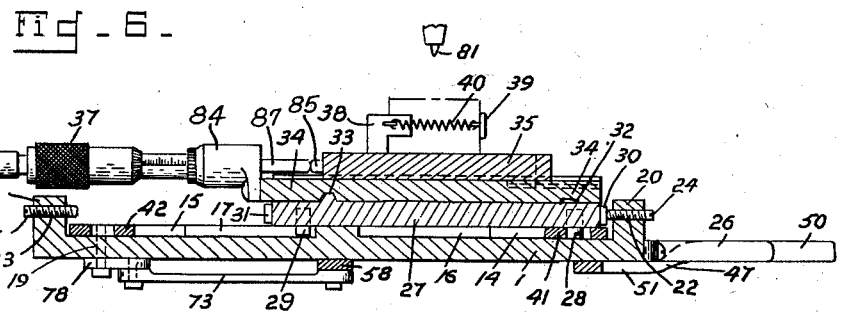
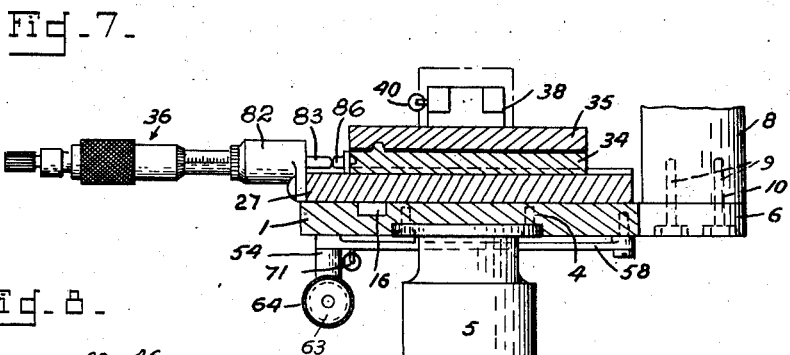
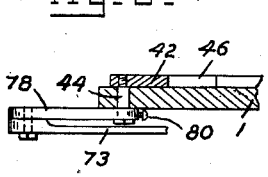
Inventors
Jacob B. Cohen
Herbert E. Hanson
By C. E. Herrstrom & W. E. Thibodeau
Attorneys Patented May 20, 1947

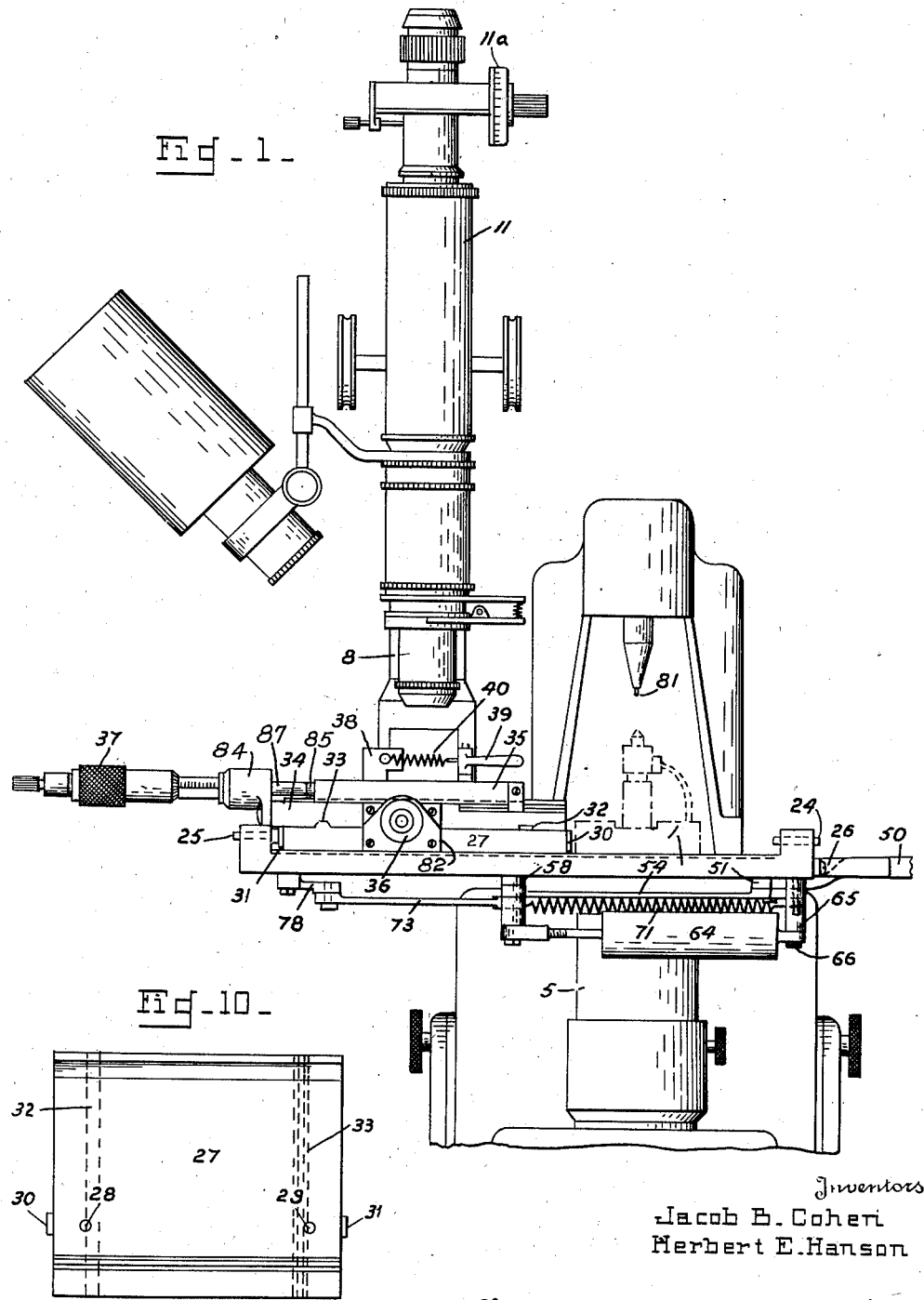

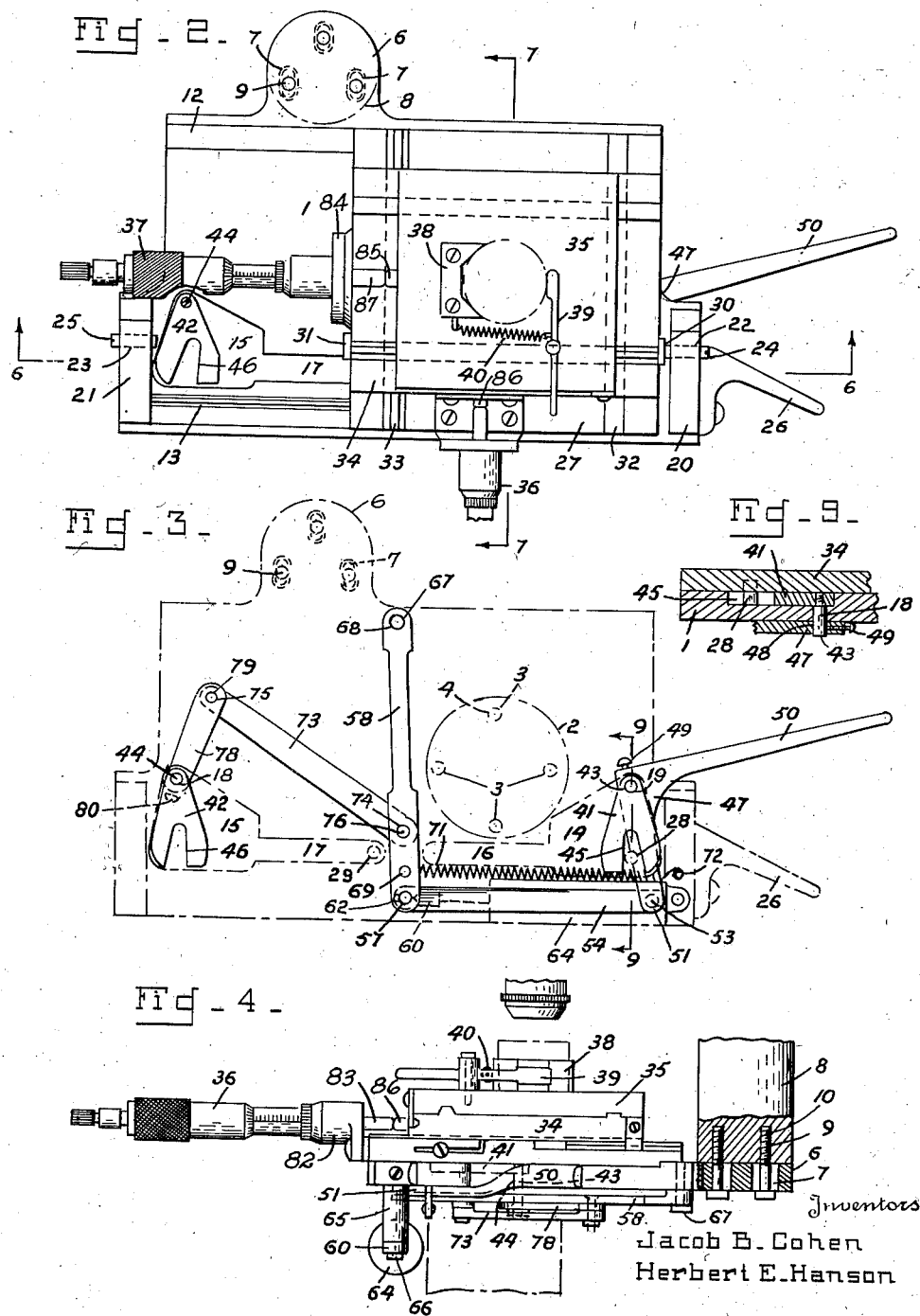

2,420,654

UNITED STATES PATENT OFFICE 2,420,654

MICROAREA PRECISION LOCATOR

Jacob B. Cohen, Brighton, and Herbert E. Hanson, Dorchester, Mass.

Application September 23, 1944, Serial No. 555,569

7 Claims. (Cl. 73—81)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to a device for accurately locating a previously selected so-called microarea or calculated location in a workpiece under a tool or indenter for making a hardness determination or for any other desired purpose.

Heretofore attempts to determine the hardness of a particular micro-area, such as a particular metallic crystal or a ferrite or carbide rejection area, for example, have been laborious and time-consuming and, at times, a near hopeless task. While means have been available for locating a previously selected point on a workpiece under a tool or indenter to within an accuracy of one-thousandth part of an inch, this is insufficient for much research work in which a precision of at least one ten-thousandth part of an inch is necessary. Similarly, in precision machine tools, such as jig bores, there is frequently need for a simple yet extremely accurate locating device as, for example, for aligning the axis of a boring or engraving tool, with a calculated position on a workpiece with an accuracy of microscopic precision.

Accordingly, it is a particular object of this invention to provide a device for locating a previously selected micro-area or calculated location on a workpiece under a tool, or indenter, of a hardness testing machine, such as one of the type commonly known as a Tukon Tester, for example, to within an accuracy of one ten-thousandth part of on inch.

The specific nature of the invention as well as other objects and advantages thereof will clearly appear from a description of a preferred embodiment as shown in the accompanying drawings in which Fig. 1 is an elevational view, partly in section, showing the construction of the present invention;

Fig. 2 is a top view of Fig. 1;

Fig. 3 is a schematic view showing the arrangement of the cams and linkage connection and the position of the transfer lever when the transfer stage is under the hardness testing machine;

Fig. 4 is a side elevational view, partly in section, through the apparatus of the invention;

Fig. 5 is a view similar to Fig. 3 showing the arrangement of the cams and linkage connection and the position of the lever after the transfer stage has been moved under the microscope;

Fig. 6 is a sectional view on the line 6—6 of Fig. 2;

Fig. 7 is a sectional view on the line 7—7 of Fig. 2;

Fig. 8 is a partial detail view to show the lever and connecting bar assembly;

Fig. 9 is a sectional view on the line 9—9 of Fig. 3; and

Fig. 10 is a top plan view to show the transfer stage.

In Fig. 1 is shown in elevation an assembly of the locating device, together with an attached microscope and indenting head of a hardness testing machine of conventional construction.

A platen 1 (Fig. 2) has on its under side a circular recess 2 (Fig. 3), in the bottom of which are provided a plurality of screw holes 3 for receiving cap screws 4, by means of which, the platen may be attached to a pedestal 5 of a hardness testing machine. A horizontally projecting lug 6 on the rear edge of the platen 1 is provided with a plurality of slot-like holes 7 and a microscope stand 8 is mounted on this lug, being secured in location as by means of cap screws 9 which extend through holes 7 and arranged to threadably engage corresponding screw holes 10 provided in the bottom of stand 8. Microscope stand 8 is provided with a microscope 11 equipped with a filar micrometer 11a.

Platen 1 is provided on its upper surface with parallel longitudinal bearing and guide strips 12 and 13 respectively, with cam recesses 14 and 15 and clearance slots 16 and 17 leading therefrom. Vertical holes 18 and 19 are provided to extend through said platen from the recesses 14 and 15 for a purpose to be explained later. Two upwardly projecting shoulders 20 and 21, one on each end of platen 1, have screw holes 22 and 23 for threadably receiving screw stops 24 and 25 respectively. A fixed arm 26, attached to the right end shoulder 20 (Fig. 2), extends horizontally and generally endwise for a purpose which will become evident later.

A transfer stage 27 rests on said bearing and guide strips 12 and 13. This transfer stage is provided on its under side with locking pins 28 and 29 which project downward into cam recess 14 and slot 17, or recess 15 and slot 16, depending on the longitudinal location of transfer stage 27 on platen 1.

Stops 30 and 31 are provided at the ends of transfer stage 27 and on the upper face of said stage are provided parallel bearing and guide strips 32 and 33 for carrying a conventional micrometer locating stage assembly consisting of a lower stage 34 which is reciprocally movable forwardly and rearwardly as viewed in Fig. 1, and an upper stage 35 which is reciprocally movable from right to left as viewed in Fig. 1. A micrometer bracket 82 is suitably secured to the front side of transfer stage 27 as viewed in Fig. 1 and supports a conventional micrometer adjusting element 36. The spindle 83 of micrometer adjusting element 36 engages a stop projection 86 on lower stage 34. Likewise a micrometer bracket 84 is suitably secured to the left side of lower stage 34 as viewed in Fig. 1 and supports a micrometer adjusting element 37. The spindle 87 of micrometer adjusting element 37 engages a stop projection 85 on upper stage 35. On upper stage 35 is provided a specimen or workpiece holder consisting of a V-block 38 with a pivoted pawl 39 and tension spring 40.

In recesses 14 and 15 are located locking cams 41 and 42, integral with downwardly depending pivot pins 43 and 44 which extend thru holes 18 and 19 respectively. These cams 41 and 42 are provided with slots 45 and 46 respectively and are of symmetrical form with respect to a vertical plane midway between them. The cams 41 and 42, thru integral pivot pins 43 and 44 respectively, are connected thru a system of levers and bars on the under side of platen 1 so that their angular motion is always of equal magnitude but of opposite direction, said cams being at all times in symmetrical relation. When transfer stage 27 is in its right hand position shown in Figs. 2 and 3, locking pin 28 is engaged in the slot 45 of cam 41, while when transfer stage 27 is in its left hand position shown in Fig. 1, locking pin 29 is engaged in slot 46 of cam 42.

An L-shaped transfer and locking lever 47 is firmly attached in a horizontal plane to the lower end of pivot pin 43 which is secured in hole 48 in lever 47 as by a set screw 49. A longer arm 50 of lever 47 is formed to serve as a handle or grip, being offset so that in assembled relation the grip will be in horizontal alignment with fixed arm 26 on the end of platen 1.

A shorter arm 51 extends horizontally at right angles to long arm 50, adjacent the end thereof, with a pivot pin 53 pivotally mounting said arm 51 to one end of a connecting bar 54. The other end of bar 54 is pivotally engaged by a pin 57 in a rocker arm 58, which pin 57 also engages an eye bolt 60 retained in assembly on pin 57 by a cotter pin 62.

Eye bolt 60 is threadably connected to a piston 63 located within a dash pot 64, which in turn is secured at its closed end to a stud 65 as by means of a cap screw 66. The stud 65 extends vertically downward from the under side of platen 1 (preferably, at a point adjacent the front right corner of platen 1 as shown in Figs. 1 and 4.)

Rocker arm 58, pivotally attached to platen 1 by a pivot screw 67 thru a hole 68 therein, is provided with a pin 69 to which is attached one end of a helical spring 71. The other end of said spring is secured to a pin 72 in platen 1. The spring and dash pot are thus connected in parallel functional relationship.

A second connecting bar 73 provided with holes 74 and 75 is pivotally attached at one end to rocker arm 58 by a pivot screw 76 which engages hole 74. At the opposite end it is pivoted to a lever 78 by means of a pivot screw 79 in hole 75, the lever 78 being secured to the lower end of pin 44 by means of a set screw 80, thereby completing the connection between cams 41 and 42 in such manner that when activated by moving arm 50 of lever 47, the angular motions of cams 41 and 42 are of exactly equal magnitude but of opposite rotational direction.

The function of the locating device described, when used in conjunction with a hardness testing machine, is the translation of the specimen mounted on the locating stage 35, so that a selected micro-area on the specimen will be placed directly below the indenting point 81 of the hardness testing machine.

In setting up the precision locator for use, the microscope is first located and secured in position by screws 9 thru slots 7, so that an indentation made by the hardness testing machine on a specimen clamped in V-block 38, will be transferred directly across the center of the field of the microscope 11 when the transfer stage 27 is moved to the microscope end of platen 1. Final adjustment forward or backward may be accomplished by means of the filar micrometer 11a. The screw stops 24 and 25 are then adjusted so that the motion of the transfer stage 27 exactly equals the distance between the optical axis of the microscope 11 and the tip of the indenter 81.

Thus the center of an indentation, made with the transfer stage 27 held at rest under the indenter by the buffer stop mechanism, will be brought to rest in alignment with the optical axis of the microscope, when the transfer stage has been moved to the microscope end of the platen 1 and eased into position by the buffer stop mechanism or vice versa.

It is thus apparent that once the microscope has been adjusted forwardly or rearwardly to a position in which the optical axis is in lateral alignment with the indenter, adjustment of the sidewise limits of motion by means of the screw stops 24 and 25 so that the indentation made in the specimen will be brought to rest exactly in the center of the microscope field, is a simple matter.

It is important that the surface of the specimen be parallel to the surface of the stage and therefore perpendicular to the indenter for otherwise the indentation will be asymmetrical and result in erroneous measurements. In addition, care must be taken to prevent tilting of specimens by the thrust from the pawl 39, since this tilting will also result in erratic placement of the indentation.

In operation, a specimen is secured in location between V-block 38 and pawl 39 on upper locating stage 35. By manipulation of micrometers 36 and 37 which control the movement of lower and upper stages 34 and 35 respectively, a micro-area, of which the hardness is to be determined, is located and positioned under the cross hairs of the filar micrometer 11a.

When the specimen has been located in proper position under the microscope 11, movable arm 50 is drawn up to fixed arm 26, thereby rotating cams 41 and 42 as shown in Fig. 5 reversing the stress applied by cam 42, through locking pin 29, to transfer stage 27 from a thrust against the stop 25 to a thrust away from said stop, and causing transfer stage 27 to be moved about one-half inch toward the right. Now without releasing arm 50, transfer stage 27 is transferred by any convenient means to the right until engaging pin 28 enters slot 45 in cam 41. Arm 50 is now released and spring 71 and dash pot 64 combine to reverse the motion of cams 41 and 42 causing cam 41 to act upon engaging pin 28 and gently ease transfer stage 27 into position against stop 24 in such a way that any jarring is substantially obviated and so that the pressure against the stop is always the same. The selected micro-area to be tested is now directly beneath the indenter 81 in position for making an impression.

After a hardness indentation has been made, lever arm 50 is again manually drawn up to fixed arm 26, thereby rotating cams 41 and 42 and releasing engaging pin 28 from slot 45 and biasing transfer stage 27 toward the left. Now without releasing lever arm 50, transfer stage 27 is pushed to the left until engaging pin 29 enters slot 46 in cam 42, whereupon arm 50 is released and transfer stage 27 is gently eased into position with stop 31 against screw stop 25.

With this invention, it is possible, with the aid of the attached microscope to select a particular micro-area on a workpiece, transfer said workpiece to a position under the testing machine, in which position the previously selected micro-area is aligned with the indenter of said hardness testing machine within an accuracy of about one ten-thousandth part of an inch, make a hardness indentation and return the workpiece to its original position under the microscope for measurement.

All this is very accurately accomplished by the above described apparatus which not only relocates the selected areas, but also holds their original orientation and substantially eliminates, by means of the buffer-stop mechanisms, any physical jarring attending the transfer of the stages upon which the specimen is secured, and any consequent variation in setting.

We claim:

1. An apparatus for making a precision location of a previously determined area in a workpiece with respect to a tool member of a machine comprising in combination, a platen arranged to be attached to the machine, said platen being provided with spaced cam recesses therein, a transfer stage mounted on said platen for movement between a first position relatively remote from the tool member and a second position adjacent the tool member, said transfer stage having projections which extend into said recesses, a micrometer locating stage assembly on said transfer stage including workpiece holding means, spring pressed locking cams in said recesses respectively engageable with said projections to impart biasing forces to said transfer stage relative to said platen in directions respectively toward said first and second positions, and adjustable stop means on said platen for determining said positions of said transfer stage whereby said transfer stage may be repeatedly accurately located in said first or second position.

2. An apparatus for making a precision location of a previously determined area in a workpiece with respect to a tool member of a machine comprising in combination, a platen arranged to be attached to the machine, said platen being provided with spaced cam recesses therein, a movable transfer stage mounted on said platen for linear movement between a first position relatively remote from the tool member and a second position adjacent the tool member, said transfer stage having projections which extend into said recesses, a micrometer locating stage assembly on said transfer stage including workpiece holding means, spring pressed locking cams in said recesses respectively engageable with said projections to impart biasing forces to said transfer stage relative to said platen in directions respectively toward said first and second positions, adjustable stop means on said platen for determining said first and second positions of said transfer stage whereby said transfer stage may be repeatedly accurately located in said first or second positions, and mechanical means for simultaneously moving said locking cams to a releasing position relative to said projections whereby said transfer stage may be freely moved between its said first and second positions.

3. An apparatus for making a precision location of a previously determined micro-area in a workpiece with respect to a tool member of a machine comprising in combination, a platen arranged to be attached to the machine and having a microscope mounted thereon, said platen being provided with a pair of spaced cam recesses therein, a transfer stage mounted on said platen for movement between a first position in the field of said microscope and a second position adjacent said tool member, said transfer stage having projections which extend into said recesses, a micrometer locating stage assembly on said transfer stage including workpiece holding means, spring pressed locking cams in said recesses respectively engageable with said projections to impart biasing forces to said transfer stage relative to said platen in directions respectively toward said first and second positions, and adjustable stop means on said platen for determining said first and second positions of said transfer stage whereby said transfer stage may be repeatedly accurately located relative to said microscope and the tool member of the machine.

4. A precision locator for making hardness determinations of a selected micro area of a specimen comprising in combination, a hardness testing machine having an indenting member, a platen attached to said hardness testing machine and having a microscope mounted thereon, said platen being provided with a pair of spaced cam recesses therein, a transfer stage mounted on said platen for linear movement between a first position in the field of said microscope and a second position adjacent said indenting member, a pair of adjustable stops on said platen for respectively determining said positions of said transfer stage, said transfer stage being provided with projections on its lower side which extend into said recesses, a micrometer locating stage assembly on said transfer stage including specimen holding means, locking cams pivotally mounted in said recesses and arranged to be movable through angles of equal magnitude but in opposite rotational directions, said locking cams being respectively engageable with said projections in the said first and second positions of said transfer stage, a spring biasing said locking cams in opposite directions to thereby respectively bias said transfer stage against either of said stops, a dash pot connected in parallel with said spring, and mechanical means for simultaneously moving said locking cams to a releasing position relative to said projections whereby said transfer stage may be freely moved between its said first and second positions.

5. An apparatus for making a precision location of a previously determined area in a workpiece with respect to a tool member of a machine comprising in combination, a platen arranged to be attached to the machine, a transfer stage movable on said platen between a first position relatively remote from the tool member to a second position adjacent the tool member, means for supporting a workpiece on said transfer stage including means for adjusting the position of such workpiece relative to said transfer stage, a pair of adjustable stops on said platen for respectively determining said first and second positions of said transfer stage relative to the tool member of the machine, a pair of movable cam members respectively engageable with said transfer stage in its said first and second positions, linkage means interconnecting said cam members, and resilient means for simultaneously biasing said cam members respectively in opposite directions to thereby bias said transfer stage against either of said stops.

6. A precision locator for making hardness determinations of a selected micro-area of a specimen comprising in combination, a hardness testing machine having an indenting member, a platen attached to said hardness testing machine and having a microscope mounted thereon, a transfer stage movable relative to said platen between a first position in the field of said microscope and a second position adjacent said indenting member, a micrometer locating stage assembly on said transfer stage including specimen holding means, adjustable stop means on said platen for respectively determining said first and second positions of said transfer stage relative to said microscope and the indenting member of said hardness testing machine, a pair of movable cam members respectively engageable with said transfer stage in its said first and second positions, linkage means interconnecting said cam members, and resilient means for simultaneously biasing said cam members respectively in opposite directions to thereby bias said transfer stage against either of said stop means.

7. A precision locator for making hardness determinations of a selected micro-area of a specimen comprising in combination, a hardness testing machine having an indenting member, a platen attached to said hardness testing machine and having a microscope mounted thereon, a transfer stage movable relative to said platen between a first position in the field of said microscope and a second position adjacent said indenting member, a micrometer locating stage assembly on said transfer stage including specimen holding means, adjustable stop means on said platen for respectively determining said first and second positions of said transfer stage relative to said microscope and the indenting member of said hardness testing machine, a pair of movable cam members respectively engageable with said transfer stage in its said first and second positions, linkage means interconnecting said cam members, a spring arranged to simultaneously bias said cam members respectively in opposite directions to thereby bias said transfer stage against either of said stop means, and a dash pot connected in parallel relationship to said spring and arranged to cushion the movement of the transfer stage imparted by said spring.

JACOB B. COHEN.
HERBERT E. HANSON.

REFERENCES CITED

The following references are of record in the file of this patent:

UNITED STATES PATENTS

| Number | Name | Date |
| --- | --- | --- |
| 1,422,161 | Woodrow | July 11, 1922 |
| 2,289,874 | Curtis | July 14, 1942 |
| 1,585,278 | Bierbaum | May 18, 1926 |
| 1,891,052 | Ott | Dec. 13, 1932 |
| 1,875,134 | Pfund | Aug. 30, 1932 |

FOREIGN PATENTS

| Number | Country | Date |
| --- | --- | --- |
| 656,113 | Germany | Jan. 29, 1938 |
| 685,573 | Germany | Dec. 20, 1939 |